US006478864B1

(12) United States Patent
Field

(10) Patent No.: US 6,478,864 B1
(45) Date of Patent: Nov. 12, 2002

(54) SURFACE COATING COMPOSITION

(75) Inventor: Rex J. Field, Arcola, IL (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/669,237

(22) Filed: Sep. 25, 2000

Related U.S. Application Data

(60) Provisional application No. 60/156,425, filed on Sep. 28, 1999.

(51) Int. Cl.[7] ................................................ C09D 7/12
(52) U.S. Cl. ........................... 106/169.17; 106/163.01; 106/169.55; 106/201.1; 106/204.01; 106/204.3; 106/287.14; 106/287.15; 106/287.34; 106/287.35; 523/218; 524/1; 524/492; 524/493; 428/403; 428/404; 428/405
(58) Field of Search ..................... 106/189.55, 204.3, 106/163.01, 109.17, 169.55, 201.1, 204.01, 287.14, 287.15, 287.34, 287.35; 524/1, 492, 493; 523/218; 428/403, 404, 405

(56) References Cited

U.S. PATENT DOCUMENTS

| | | | |
|---|---|---|---|
| 3,953,646 A | | 4/1976 | Fletcher et al. |
| 4,263,051 A | | 4/1981 | Crawford et al. |
| 4,374,687 A | | 2/1983 | Yamamoto |
| 5,009,874 A | | 4/1991 | Parmentier et al. |
| 5,519,080 A | | 5/1996 | Matsushita et al. |
| 5,738,801 A | | 4/1998 | Ziegler et al. |
| 5,814,397 A | | 9/1998 | Cagliostro et al. |
| 5,936,021 A | * | 8/1999 | Bryant et al. ............... 524/430 |

FOREIGN PATENT DOCUMENTS

| | | | | |
|---|---|---|---|---|
| EP | 0 550 915 A1 | 7/1993 | ............ | C09D/5/02 |
| GB | 721 605 | 1/1955 | | |
| GB | 1 062 599 | 3/1967 | | |
| GB | 1 363 039 | 8/1974 | | |
| WO | WO 96/02158 | 2/1996 | | |
| WO | WO 98/23366 | 6/1998 | | |

OTHER PUBLICATIONS

CAPLUS AN: 1966: 421862, Carlee, "Acrylic latex mixtures for coating cloth", May 1966.*
CAPLUS AN: 1997:557532, Nishikawa et al, "Washfact antibacterial and deodoring agents . . . ", Aug. 1997.*
S.E. Maskery, "*The Dispersion, Matting Efficiency and Formulation of Silica Matting Agents in Wood Finishes*" *Lecture to be Given to the Association of Paint Technologists at the Paint and Polymers Exhibition in Milan* (Nov. 3, 1981).

S.E. Maskery, "*Development and Applications for Matting Agents*" in *Pigment and Resin Technology*, pp. 11–19 (Apr. 1973).
R.J. Field et al., "*Matting of UV Coatings with Silica: Effects of Particle Size (Parft 2)*" *PPCJ* pp. 35–38 (Nov. 1995).
Monsanto Applications Guide to the Effective Use of Santocel® Silica Aerogels (no date provided).
"*Monsanto's Silica Aerogel for Efficient Thermal Insulation*" *Monsanto Technical Bulletin* I–180, pp. 1–10 (Oct. 1959).
Monsanto's Santocel brochure (pp. 1–10) (no date provided).
"*Today's Flatting Agents for Tomorrow's Formulation*" *Degussa Technical Library* GP–91, pp. 1–6 (no date provided).
"*HK 188 vs. Syloid 244*" *Degussa Technical Library* GP–98, pp. 1–8, (no date provided).
International Search Report for PCT/US00/26221 mailed Feb. 9, 2001.
JP06136320 A to Mitsubishi Kasei Corp.—Abstract only (no month provided 1994) (from Database WPI, Week 199424, AN 1994–197356).
RU2092511 C1 to Svema Sci Prodn Assoc.—Abstract only (from Database WPI, Week 199822, AN 1998–249604) (no month provided 1998).
JP60137939 A to Asahi Glass Co., Ltd.—Abstract only (from Database WPI, Week 198535, AN 1985–214359) (no month provided 1985).
JP03215570 A to Tokyo Silicone KK—Abstract only (from Database WPI, Week 1999145, AN 1991–327872) (no month provided 1991).
JP05001191 A to Achilles Corp.—Abstract only (from Database WPI, Week 199306, AN 1993–049707) (no month provided 1993).

* cited by examiner

*Primary Examiner*—David Brunsman
(74) *Attorney, Agent, or Firm*—Tim A. Cheatham

(57) ABSTRACT

The present invention provides a surface coating composition comprising a resin, a hydrophobic metal oxide, and a carrier, wherein said composition, after application to a substrate, is characterized by moisture resistance, organic alcohol resistance, and a matting effect. In addition, the present invention provides a method of matting a surface coating composition and enhancing the moisture and chemical resistance of the composition, as well as a method of treating a substrate with the surface coating composition, and a substrate coated with such a surface coating composition.

58 Claims, No Drawings

SURFACE COATING COMPOSITION

CROSS-REFERENCE TO RELATED PATENT APPLICATIONS

This patent application claims priority to provisional U.S. Patent Application No. 60/156,425 filed on Sep. 28, 1999.

TECHNICAL FIELD OF THE INVENTION

The present invention relates to a surface coating composition that is characterized by moisture and chemical resistance and a method of imparting such characteristics to a surface coating composition.

BACKGROUND OF THE INVENTION

Metal oxides, particularly dry silica gels, have been incorporated into certain surface coating materials in order to achieve the impression of "mattness." A wet film applied to a substrate is initially held flat and therefore glossy by the forces of surface tension. As the film dries and cures, the increasing viscoelasticity associated with the sol-gel transition hinders the movement of particles into the film, and the surface deforms to accommodate the matting agent particles. This roughness is maintained in the solidified film, which then is characterized by a matt finish. While the matting effect attributable to certain silica gels produces a desirable surface appearance for some applications, a surface coating composition desirably possesses additional properties, such as moisture resistance, in order to enhance its utility for a variety of applications.

Moisture resistance is a characteristic of a composition such that the composition resists damage after wetting by or absorption of water. Prior attempts at rendering a surface coating composition moisture resistant have focused on the hydrophobic modification of the silica aerogel. Silica xerogels, for example, have been rendered hydrophobic by esterification with organic alcohols at high temperatures or by physical adsorption of organic polymers. While such agents may impart a degree of hydrophobicity to the silica aerogel, these surface materials remain reactive and can be lost from the xerogel in the presence of other reactive species, such as alcohols and water. The moisture resistance properties imparted to the composition by the silica gel, if any, can be accordingly degraded when the composition is exposed to other chemical agents. Such exposure to other chemical agents, such as alcohols, often occurs when the composition is a surface coating, such as a coating on wood furniture.

Thus, there remains a need for surface coating compositions that provide a matting effect while also imparting moisture and chemical resistance to substrates. The present invention seeks to provide such a surface coating composition. These and other advantages of the present invention, as well as additional inventive features, will be apparent from the description of the invention provided herein.

BRIEF SUMMARY OF THE INVENTION

The present invention provides a surface coating composition comprising a resin system, and a hydrophobic metal oxide, wherein said composition, after application to a substrate, is characterized by (a) a moisture resistance which is retained for at least about 6 months, (b) a resistance to a 50% w/w ethanol/water solution, and (c) a gloss level of about 50 gloss units or less.

The present invention also provides a method of matting a surface coating composition and enhancing the moisture and chemical resistance of the composition comprising (i) providing a hydrophobic metal oxide which imparts to the composition, after application to a substrate, (a) a moisture resistance which is retained for at least about 6 months, (b) a resistance to a 50% w/w ethanol/water solution, and (c) a gloss level of less than 50 gloss units, and (ii) mixing the metal oxide with a resin system to form the surface coating composition.

The present invention further provides a substrate having a surface coated with the surface coating composition of the present invention, as well as a method of treating a substrate with the present inventive surface coating composition.

DESCRIPTION OF THE PREFERRED EMBODIMENTS

The present invention provides a surface coating composition comprising a resin system, and a hydrophobic metal oxide. The composition, after application to a substrate, is characterized by (a) a moisture resistance which is retained for at least about 6 months, (b) a resistance to an organic alcohol solution, particularly a resistance to a 50% w/w ethanol/water solution, and (c) a gloss level of 50 gloss units or less.

The resin system can comprise any suitable resin. Thus, the resin can be any resin known by those of skill in the art to be suitable for use in a surface coating composition. Suitable resins include, for example, polyesters, epoxies, urethanes, cellulosics, alkyds, acrylics, and mixtures and precursors thereof. Suitable acrylic resins for use in the composition of the present invention include those known as WORLEE CRYL A 1220 (E.H. Worlee & Co., Germany) and NEOCRYL A-633 (Zeneca Resins, Wilmington, Mass.).

Preferably, the resin is a nitrocellulose or a nitrocellulose alkyd. Suitable nitrocellulose resins include LANCO CL-600 (Lanco Manufacturing Corporation, San Lorenzo, Calif.), and cellulose nitrate. Among the useful alkyd resins are those known as WORLEEKYD T36 (E.H. Worlee & Co, Germany).

Any suitable amount of resin can be present in the surface coating composition. The resin is preferably present in the surface coating composition in an amount of about 10–95% w/w.

Any suitable metal oxide can be used in the context of the present invention. Suitable metal oxides include silica, alumina, titania, zirconia, ceria, and magnesia. The metal oxide preferably is silica, such as, for example, fumed (or pyrogenic) silica, precipitated silica, or silica aerogel, with silica aerogel being particularly preferred. The term "aerogel" refers to a substantially amorphous organic or inorganic gel with air in the pores. Most preferably, the aerogel comprises silica and is prepared by modifying the surface of a hydrogel with a silylating agent and drying the surface-modified gel. The silica aerogel produced by this process may be partially or completely hydrophobic depending on the degree and type of silylation. The silica aerogels disclosed in WO 98/23366 are especially desirable as the metal oxide in the surface coating composition of the present invention.

The treated metal oxide has a hydrophobic character. Any suitable hydrophobic moiety may be bonded to the metal oxide of the present invention to obtain the effect. Suitable hydrophobic moieties are derived, for example, from compounds of the following general formulae:

Wherein the radicals R are identical or different and are each hydrogen or a nonreactive, organic, linear, branched, cyclic, saturated or unsaturated, aromatic or heteroaromatic radical, preferably $C_1$–$C_{18}$ alkyl or $C_6$–$C_{14}$ aryl, more preferably $C_1$–$C_6$ alkyl, cycloalkyl, phenyl, vinyl, or acryl. Equally suitable hydrophobic moieties can be derived from silanes of the formulae $R^1_{4-n}SiCl_n$ or $R^1_{4-n}Si(OR^2)_r$, where n=1–4, and $R^1$ and $R^2$ are identical or different and are each hydrogen or a nonreactive, organic, linear, branched, cyclic, saturated or unsaturated, aromatic or heteroaromatic radical, preferably a $C_1$–$C_{18}$ alkyl or $C_6$–$C_{14}$ aryl, and more preferably a $C_1$–$C_6$ alkyl, cyclohexyl, or phenyl. The radicals may also contain halogen substituents, such as fluorine or chlorine. Most preferably, the hydrophobic moiety is a trimethyl silyl, a vinyl dimethyl silyl, a acryl dimethyl silyl, or a dimethyl dicholor silyl.

The metal oxide preferably is characterized by a degree of hydrophobicity of at least about 40% v/v. The degree of hydrophobicity desirably is as high as possible inasmuch as a higher degree of hydrophobicity generally provides improved water resistance.

The term "degree of hydrophobicity" refers to the ratio by volume of methanol in a water-methanol mixture that wets the silica aerogel, thereby forming a homogeneous suspension.

The metal oxide can be in the form of discrete individual particles, which can be in aggregated or non-aggregated form. The metal oxide particles can have any suitable diameter. Generally, the metal oxide has a median particle diameter of about 1–15 μm (e.g., 2–15 μm), preferably 2–10 μm. The particle size of the metal oxide should be sufficient to impart a desirable matting effect to the surface coating composition.

The metal oxide can have any suitable surface area. Generally, the metal oxide has a surface area of at least about 100 m²/g, preferably at least about 200 m²/g, and most preferably at least about 300 m²/g. The metal oxide also can have any suitable particle density, such as about 0.1–0.3 g/cm³.

The metal oxide can have any suitable porosity. Typically the metal oxide has a porosity of at least 50%, preferably about 70% or more, and most preferably about 80% or more.

The metal oxide can be present in the surface coating composition in any suitable amount. For example, the metal oxide can be present in the surface coating composition in an amount of about 0.5–10% w/w.

Optionally, any suitable carrier (e.g., solvent) can be used in the surface coating composition. A carrier is used to facilitate the application of the resin and metal oxide onto the surface of a suitable substrate. Suitable carriers include water, alcohols, ketones, esters, ethers, aromatics, alkyls, and mixtures thereof. Any suitable concentration of carrier can be present in the surface coating composition, such as up to about 80% w/w.

The surface coating composition of the present invention also can include any of a variety of components that are known in the art to be suitable for incorporation into a surface coating composition. Such components include colorants, pigments, UV stabilizers, coalescing agents, flow additives, defoamers, surfactants, rust inhibitors, and pH adjustment agents.

The coalescing agent promotes the softening of the resin during drying of the components of the surface coating composition, and such materials are well known. One example of a coalescing agent is butyl CELLOSOLVE (ARCO Chemical Company, Newtown Square, Pa.). Any suitable concentration of coalescing agent can be present in the surface coating composition, such as about 1–35% w/w.

The flow additive promotes the wetting of the substrate by the surface coating composition and the levelling of the surface coating composition. A typical flow additive is DISBERBYK 301 (BYK-Chemie, Germany). Any suitable concentration of flow additive can be present in the surface coating composition, such as about 0.5–4% w/w.

A defoamer can be added to reduce the presence of bubbles in the surface coating composition upon mixing of the components. Any suitable defoamer can be used in the surface coating composition of the present invention. One preferred defoamer is DISBERBYK 035 (BYK-Chemie, Germany). Any suitable concentration of defoamer can be present in the surface coating composition, such as about 0.01–3% w/w.

A surfactant can be added to reduce the surface tension of the coating composition. Any suitable surfactant can be used in the surface coating composition of the present invention. One preferred surfactant is SURFYNOL 104 BC (Air Products & Chemicals, Inc.). Any suitable concentration of surfactant can be present in the surface coating composition, such as about 0.01–3% w/w.

If the surface coating composition is applied to surfaces vulnerable to corrosion, a rust inhibitor may be added to the composition. A variety of rust inhibitors are suitable for the present invention. One preferred rust inhibitor is ammonium benzoate. Any suitable concentration of rust inhibitor can be present in the surface coating composition, such as about 0.01–2% w/w.

A pH adjustment agent can be added to control the pH of the surface coating composition. The pH of the composition is maintained in a range generally suitable for surface coating compositions. Any suitable pH adjustment agent can be used in the surface coating composition of the present invention. One preferred pH adjustment agent is ammonium hydroxide. Any suitable concentration of pH adjustment agent can be present in the surface coating composition, such as about 1–4% w/w.

The surface coating composition retains its moisture resistance for at least 6 months, preferably for at least 1 year, and most preferably for at least 2 years. Moisture resistance can be determined by visibly examining the extent (if any) of discoloration (generally, white chalky appearance) of a surface coated with the surface coating composition of the present invention after (approximately 16 hours) the application of cold water (15–20 drops) to the surface. The surface coating composition of the present invention preferably demonstrates no discoloration after the application of water to the coated surface.

Despite the ability of the surface coating composition of the present invention to remain soluble or dispersed in an organic alcohol solvent system, it has been discovered that the surface coating composition, after application to a substrate, resists discoloration upon addition of an organic alcohol solution. Indeed, with relatively concentrated organic alcohol solutions, i.e., about 50–70% w/w, the surface coating composition, after application to a substrate, demonstrates only a slight change in appearance. The degree of resistance can be measured by applying the surface coating composition to a substrate, particularly a black Leneta chart, and allowing it to dry thereon so as to form a 40 μm film of the surface coating composition on the substrate. About 7 drops of an alcohol solution, particularly a solution containing 50% w/w ethanol and 50% w/w water, then is placed on the surface of the film, and the alcohol solution on the surface of the film is covered with a watch glass. After approximately 16 hours, the liquid is removed and the substrate is examined visually to determine the extent of discoloration (usually in the form of a white chalky appearance) of the surface of the substrate or of the coating.

Preferably the surface coating composition of the present invention, after application to a substrate, is characterized by a resistance to an organic alcohol solution, particularly a 50% w/w ethanol in water solution, such that only a slight visible discoloration appears after application of the organic alcohol solution to the coated substrate. More preferably the resistance to an organic alcohol solution is such that no visible discoloration appears after application of the alcohol solution to the coated substrate. Accordingly, as used herein, "a resistance to a 50% w/w ethanol/water solution" refers to the absence of or only slight appearance of a visible change (usually in the form of discoloration) to the surface characteristics of the coated substrate (black Leneta chart), which is coated with a 125 μm film (wet) of the surface coating composition of the present invention, after application of an ethanol/water solution containing 50% w/w ethanol and 50% w/w water as described above.

The surface coating composition of the present invention, after application to a substrate, is also characterized by a matting effect. Preferably the surface coating composition is characterized by a gloss level of 50 gloss units or less (as measured by a BYK-Gardner gloss meter). More preferably the surface coating composition is characterized by a gloss level of 40 gloss units or less (e.g., 30 gloss units or less). Matt surfaces are desirable for many applications. For example, the reduced glare of surfaces in schools, hospitals, and universities offers less chance of visual distraction, and concentration is better in such environments. Such finishes also demonstrate less tendency to become unsightly as time progresses, as small scratches and imperfections are less obvious than on gloss surfaces. Finally, matt finishes may create visually appealing surfaces on wood.

The present invention also provides a method of matting a surface coating composition and enhancing the moisture and chemical resistance of the composition comprising (i) providing a hydrophobic metal oxide which imparts to the composition, after application to a substrate, (a) a moisture resistance which is retained for at least about 6 months, (b) a resistance to an organic alcohol solution, and (c) a gloss level of 50 gloss units or less, and (ii) mixing the metal oxide with a resin to form the surface coating composition. optionally, the resin and metal oxide can be mixed together with a carrier. The resin, hydrophobic metal oxide, carrier, and composition characteristics are as described above with respect to the present inventive surface coating composition.

The present invention also encompasses a substrate having a surface coated with the surface coating composition disclosed herein. Any substrate suitable for the application of a surface coating composition is contemplated by the present invention. Such substrates include wood, plastics, clothing (e.g., leather goods), metal, and upholstery (e.g., automotive interior surfaces). Preferably the substrate is a porous surface, such as wood.

A substrate can be treated with the surface coating composition by any suitable technique. For example, the surface coating composition can be applied to the substrate by brushing or by spraying.

As the surface coating composition of the present invention, after application to a substrate, is characterized by a resistance to an organic alcohol solution, the composition functions to protect the surface of a substrate, such as furniture, from discoloration after exposure to alcohol solutions (i.e., alcoholic beverages). In addition, the matting effect of the surface coating composition is desirable if a low gloss surface coating is required, as for example, in furniture lacquers and interior paints for the home or office.

The following examples further illustrate the present invention but, of course, should not be construed as in any way limiting its scope.

EXAMPLE 1

This example illustrates the excellent water and alcohol resistance properties of the present inventive surface coating composition as compared to conventional surface coating compositions.

The surface coating of the present invention was prepared by conventional techniques from a hydrophobic silica aerogel and an acrylic water-based clear resin formulation. Approximately, 2% w/w of the silica aerogel was present in the surface coating composition. The acrylic resin formulation comprised 50.69% w/w NEOCRYL A-633 (an acrylic resin available from Zeneca Resins, Wilmington, Mass.), 29.95% w/w Butyl CELLOSOLVE (a coalescing agent available from Arco Chemical Company, Newtown Square, Pa.), 1.38% w/w DISBERBYK 301 (a flow additive available from BYK-chemie, Germany), 0.69% w/w DISBERBYK 035 (a defoamer available from BYK-chemie, Germany), 0.46% w/w ammonium benzoate (rust inhibitor), 2.53% w/w ammonium hydroxide (pH adjustment agent), and 14.29% w/w deionized water.

The other surface coating compositions were prepared by the same method and incorporated the same proportion of components. However, the silica aerogel in the composition was replaced by a hydrophilic silica aerogel, a fumed silica (ACEMATT TS100, available from Degussa Corporation, Ridgefield Park, N.J.), or a wax-treated silica xerogel (SYLOID ED30, available from Grace Davison, Worms, Germany). A surface coating composition also was prepared which contained only the acrylic resin formulation described above (with no silica added).

The resulting surface coating compositions were tested for water and alcohol resistance. The water and alcohol resistance was measured by preparing four testing mixtures of water (%): alcohol (%)—viz., (1) 100:0, (2) 70:30, (3) 50:50, and (4) 70:30. A 125 μm layer (wet) of each surface coating composition was applied to a black Leneta chart and allowed to dry. After the composition dried to form a film, approximately 7 drops of each testing mixture were placed on the surface of the film in different locations. The samples were covered with a watch glass and left for 12 to 16 hours. After the time elapsed, the watch glasses were carefully removed, as was any excess testing mixture remaining on the surface. The surface of the black Leneta chart was then examined visually for discoloration (usually in the form of a white chalky appearance) and ranked according to the nature and extent of discoloration, if any. The water and alcohol resistance of the surface coating compositions are set forth in Table 1 below.

TABLE 1

| Acrylic Surface Coating Composition | Water/Alcohol Resistance | | | |
|---|---|---|---|---|
| | 100% water 0% ethanol | 70% water 30% ethanol | 50% water 50% ethanol | 30% water 70% ethanol |
| Hydrophobic silica aerogel | No visible mark | No visible mark | Light hazy gray circle | Grayish-white circle |
| No silica | No visible mark | Light hazy gray circle | Deep gray opaque | White chalky |

TABLE 1-continued

Water/Alcohol Resistance

| Acrylic Surface Coating Composition | 100% water 0% ethanol | 70% water 30% ethanol | 50% water 50% ethanol | 30% water 70% ethanol |
|---|---|---|---|---|
| Fumed silica | Slightly visible mark | Light hazy gray circle | Deep gray opaque circle | Grayish-white chalky circle |
| Silica xerogel | No visible mark | Slightly visible mark | Light hazy gray circle | White chalky circle |
| Hydrophilic silica aerogel | Slightly visible mark | Light hazy gray circle | Grayish-white opaque circle | White chalky circle |

As is apparent from Table 1, the surface coating composition of the present invention (which included hydrophobic silica aerogel) demonstrated water and alcohol resistance at ethanol concentrations of 0% and 30%, and only slight discoloration appeared after the addition of a 50% and 70% ethanol solution. While the surface coating composition containing no silica appeared to demonstrate water resistance, it did not exhibit alcohol resistance. The other silica treated compositions appeared to demonstrate some degree of water and alcohol resistance, although these compositions did not perform as well as the surface coating composition of the present invention when the testing mixtures contained greater than 50% ethanol.

EXAMPLE 2

This example further illustrates the water and alcohol resistance of the present inventive surface coating composition as compared with conventional surface coating compositions.

The surface coating composition of the present invention was prepared by conventional techniques from a hydrophobic silica aerogel and a nitrocellulose resin. Approximately 1% w/w of the hydrophobic silica aerogel was present in the surface coating composition.

The nitrocellulose resin comprised 78.37% w/w LANCO CL-600 (nitrocellulose resin formulation available from Lanco Mfg., San Lorenzo, Calif.), 19.59% w/w LANCO CL-120 (solvent available from Lanco Mfg., San Lorenzo, Calif.), DISBERBYK 306 (flow additive available from BYK-Chemie, Germany), and SURFYNOL 104 BC (surfactant available from Air Products & Chemicals, Inc.). The other surface coating compositions were prepared by the same method and incorporated the same proportion of components. However, the silica aerogel in the composition was replaced by a hydrophilic silica aerogel, a fumed silica (ACEMATT TS100, available from Degussa Corporation, Ridgefield Park, N.J.), or a silica xerogel (SYLOID ED30, available from Grace Davison, Worms, Germany). A surface coating composition also was prepared which contained only the nitrocellulose resin formulation described above (with no silica added).

The water and chemical resistance of the surface coating compositions was tested as described in Example 1, and the results are set forth in Table 2 below.

TABLE 2

Water/Alcohol Resistance

| Nitrocellulose Surface Coating Composition | 100% water 0% ethanol | 70% water 0% ethanol | 50% water 50% ethanol | 30% water 70% ethanol |
|---|---|---|---|---|
| Hydrophobic silica aerogel | No visible mark | No visible mark | Slightly visible mark | Hazy gray circle |
| No silica | No visible mark | No visible mark | Faint hazy qray circle | Grayish-white circle |
| Fumed silica | No visible mark | No visible mark | Slightly visible mark | Hazy gray circle |
| Silica xerogel | No visible mark | No visible mark | Slightly visible mark | Grayish-white circle |
| Hydrophilic silica aerogel | No visible mark | No visible mark | Slightly visible mark | Light hazy gray circle |

As is apparent from Table 2, the surface coating composition of the present invention (which included hydrophobic silica aerogel) demonstrates water and alcohol resistance, although slight discoloration was visible after application of the test mixtures containing 50% and 70% ethanol.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A surface coating composition comprising a resin system and hydrophobic metal oxide particles having a median particle diameter of about 1–15 μm, wherein said composition, after application to a substrate, is characterized by (a) a moisture resistance equal to or greater than the moisture resistance of the same composition comprising hydrophilic metal oxide particles instead of hydrophobic metal oxide particles, which moisture resistance is retained for at least about 6 months, (b) a resistance to a 50% w/w ethanol/water solution that is equal to or greater than the resistance to a 50% w/w ethanol/water solution of the same composition comprising hydrophilic metal oxide particles instead of hydrophobic metal oxide particles, and (c) a gloss level of 50 gloss units or less.

2. The composition of claim 1, wherein said metal oxide particles are aerogel particles comprising silica.

3. The composition of claim 2, wherein said resin system is selected from the group consisting of cellulosics, alkyds, acrylics, epoxies, urethanes, polyesters, and mixtures thereof.

4. The composition of claim 3, wherein said resin system consists of a nitrocellulose.

5. The composition of claim 3, wherein said resin system consists of an acrylic.

6. The composition of claim 2, wherein said metal oxide particles have a surface moiety selected from the group consisting of trimethyl silyl, vinyl dimethyl silyl, acryl dimethyl silyl, and dimethyl dichloro silyl.

7. The composition of claim 2, wherein said metal oxide particles are characterized by a degree of hydrophobicity of at least about 40% v/v.

8. The composition of claim 2, wherein said metal oxide particles have a median particle diameter of about 2–15 μm.

9. The composition of claim 1, wherein said composition is characterized by a gloss level of about 40 gloss units or less.

10. The composition of claim 9, wherein said composition is characterized by a gloss level of about 30 gloss units or less.

11. The composition of claim 1, wherein said composition further comprises a carrier.

12. The composition of claim 11, wherein said carrier is an organic solvent selected from the group consisting of alcohols, ketones, esters, and ethers.

13. The composition of claim 1, wherein said resin is present in an amount of about 10–95% w/w, and said metal oxide particles are present in an amount of about 0.5–15% w/w.

14. A substrate having a surface coated with the surface coating composition of claim 1.

15. A method of treating a substrate comprising applying the surface coating composition of claim 1 to a surface of the substrate.

16. A method of matting a surface coating composition and enhancing the moisture and chemical resistance of the composition comprising:
  (i) providing hydrophobic metal oxide particles having a median particle diameter of about 1–15 $\mu$m which impart to said composition, after application to a substrate, (a) a moisture resistance equal to or greater than the moisture resistance of the same composition comprising hydrophilic metal oxide particles instead of hydrophobic metal oxide particles, which moisture resistance is retained for at least about 6 months, (b) a resistance to a 50% w/w ethanol/water solution that is equal to or greater than the resistance to a 50% w/w ethanol/water solution of the same composition comprising hydrophilic metal oxide particles instead of hydrophobic metal oxide particles, and (c) a gloss level of 50 units or less, and
  (ii) mixing said metal oxide particles with a resin to form the surface coating composition.

17. The method of claim 16, wherein said metal oxide particles are aerogel particles comprising silica.

18. The method of claim 17, wherein said resin system consists of a resin selected from the group consisting of cellulosics, alkyds, acrylics, epoxies, urethanes, polyesters, and mixtures thereof.

19. The method of claim 18, wherein said resin system consists of a nitrocellulose.

20. The method of claim 18, wherein said resin system consists of an acrylic.

21. The method of claim 17, wherein said metal oxide particles have a surface moiety selected from the group consisting of trimethyl silyl, vinyl dimethyl silyl, acryl dimethyl silyl, and dimethyl dichloro silyl.

22. The method of claim 17, wherein said metal oxide particles are characterized by a degree of hydrophobicity of at least about 40% v/v.

23. The method of claim 17, wherein said metal oxide particles have a median particle diameter of about 2–15 $\mu$m.

24. The method of claim 16, wherein said composition further comprises a carrier.

25. The method of claim 24, wherein said carrier is an organic solvent selected from the group consisting of alcohols, ketones, esters, and ethers.

26. The method of claim 16, wherein said composition is characterized by a gloss level of about 40 gloss units or less.

27. The method of claim 26, wherein said composition is characterized by a gloss level of about 30 gloss units or less.

28. The method of claim 16, wherein said resin is present in an amount of about 10–95% w/w, and said metal oxide particles are present in an amount of about 0.5–15% w/w.

29. A surface coating composition comprising a resin system and hydrophobic metal oxide particles having a median particle diameter of about 1–15 $\mu$m, wherein the composition, after application a substrate, is characterized by (a) a moisture resistance such that no surface discoloration of the composition appears after the application of cold water to the composition for approximately 16 hours, which moisture resistance is retained for at least about 6 months, (b) a chemical resistance such that no surface discoloration of the composition appears after the application of a 30% w/w ethanol/water solution to the composition for approximately 12 hours, and (c) a gloss level of 50 gloss units or less.

30. The composition of claim 29, wherein the composition, after application to a substrate, is characterized by a chemical resistance such that no surface discoloration of the composition appears after the application of a 50% w/w ethanol/water solution to the composition for approximately 12 hours.

31. The composition of claim 29, wherein the metal oxide particles are aerogel particles comprising silica.

32. The composition of claim 29, wherein the composition is characterized by a gloss level of about 40 gloss units or less.

33. The composition of claim 32, wherein the composition is characterized by a gloss level of about 30 gloss units or less.

34. The composition of claim 29, wherein the resin system is selected from the group consisting of cellulosics, alkyds, acrylics, epoxies, urethanes, polyesters, and mixtures thereof.

35. The composition of claim 34, wherein the resin system consists of a nitrocellulose.

36. The composition of claim 34, wherein the resin system consists of an acrylic.

37. The composition of claim 29, wherein the metal oxide particles have a surface moiety selected from the group consisting of trimethyl silyl, vinyl dimethyl silyl, acryl dimethyl silyl, and dimethyl dichloro silyl.

38. The composition of claim 29, wherein the composition further comprises a carrier.

39. The composition of claim 38, wherein the carrier is an organic solvent selected from the group consisting of alcohols, ketones, esters, and ethers.

40. The composition of claim 29, wherein the metal oxide particles are characterized by a degree of hydrophobicity of at least about 40% v/v.

41. The composition of claim 29, wherein the metal oxide particles have a median particle diameter of about 2–15 $\mu$m.

42. The composition of claim 29, wherein the resin is present in an amount of about 10–95% w/w, and the metal oxide particles are present in an amount of about 0.5–15% w/w.

43. A substrate having a surface coated with the surface coating composition of claim 29.

44. A method of treating a substrate comprising applying the surface coating composition of claim 29 to a surface of the substrate.

45. A method of matting a surface coating composition and enhancing the moisture and chemical resistance of the composition comprising:
  (i) providing hydrophobic metal oxide particles having a median particle diameter of about 1 –15 $\mu$m which impart to the composition, after application to a substrate, (a) a moisture resistance such that no surface discoloration of the composition appears after the application of cold water to the composition for approximately 16 hours, which moisture resistance is retained for at least about 6 months, (b) a chemical resistance such that no surface discoloration of the composition appears after the application of a 30% w/w ethanol/water solution to the composition for approximately 12 hours, and (c) a gloss level of 50 gloss units or less, and (ii) mixing the metal oxide particles with a resin to form the surface coating composition.

46. The method of claim 45, wherein the hydrophobic metal oxide particles impart to the composition, after application to a substrate, a chemical resistance such that no surface discoloration of the composition appears after the application of a 50% w/w ethanol/water solution to the composition for approximately 12 hours.

47. The method of claim 45, wherein the metal oxide particles are aerogel particles comprising silica.

48. The method of claim 45, wherein the composition is characterized by a gloss level of about 40 gloss units or less.

49. The method of claim 48, wherein the composition is characterized by a gloss level of about 30 gloss units or less.

50. The method of claim 45, wherein the resin system consists of a resin selected from the group consisting of cellulosics, alkyds, acrylics, epoxies, urethanes, polyesters, and mixtures thereof.

51. The method of claim 50, wherein the resin system consists of a nitrocellulose.

52. The method of claim 50, wherein the resin system consists of an acrylic.

53. The method of claim 45, wherein the metal oxide particles have a surface moiety selected from the group consisting of trimethyl silyl, vinyl dimethyl silyl, acryl dimethyl silyl, and dimethyl dichloro silyl.

54. The method of claim 45, wherein the composition further comprises a carrier.

55. The method of claim 54, wherein the carrier is an organic solvent selected from the group consisting of alcohols, ketones, esters, and ethers.

56. The method of claim 45, wherein the metal oxide particles are characterized by a degree of hydrophobicity of at least about 40% v/v.

57. The method of claim 45, wherein the metal oxide particles have a median particle diameter of about 2–15 $\mu$m.

58. The method of claim 45, wherein the resin is present in an amount of about 10–95% w/w, and the metal oxide particles are present in an amount of about 0.5–15% w/w.

* * * * *